United States Patent [19]

van Veldhuizen

[11] Patent Number: 4,887,262
[45] Date of Patent: Dec. 12, 1989

[54] SINGLE-CHANNEL BUS SYSTEM FOR MULTI-MASTER USE WITH BIT CELL SYNCHRONIZATION, AND MASTER STATION COMPRISING A BIT CELL SYNCHRONIZATION ELEMENT SUITABLE FOR THIS PURPOSE

[75] Inventor: Evert D. van Veldhuizen, Eindhoven, Netherlands

[73] Assignee: U.S. Philips Corporation, New York, N.Y.

[21] Appl. No.: 168,191

[22] Filed: Mar. 15, 1988

[30] Foreign Application Priority Data

Mar. 30, 1987 [NL] Netherlands ........................ 8700736

[51] Int. Cl.⁴ .............................................. H04J 3/02
[52] U.S. Cl. ................................................. 370/85.1
[58] Field of Search ...................... 370/85, 86, 88, 94, 370/60; 340/825.5, 825.51

[56] References Cited

U.S. PATENT DOCUMENTS

| | | | |
|---|---|---|---|
| 4,429,384 | 1/1984 | Kaplinsky | 370/85 |
| 4,463,351 | 7/1984 | Chiarottino | 370/85 |
| 4,470,110 | 9/1984 | Chiarottino et al. | 370/85 |
| 4,562,573 | 12/1985 | Murano et al. | 370/85 |
| 4,593,283 | 6/1986 | Uchino | 370/85 |
| 4,596,025 | 6/1986 | Satoh | 370/85 |
| 4,715,031 | 12/1987 | Crawford et al. | 370/85 |

OTHER PUBLICATIONS

U. Kiencke et al., "Automotive Serial Controller Area Network", SAE Technical Paper Series No. 860391, International Congress and Exposition, Detroit, Michigan, Feb. 24–28, 1986, pp. 1–6.

Primary Examiner—Robert L. Griffin
Assistant Examiner—Wellington Chin
Attorney, Agent, or Firm—Thomas A. Briody; Jack E. Haken; Anne E. Barschall

[57] ABSTRACT

Messages consisting of an arbitration field followed by a data field circulate in a single-channel bus system. The stations comprise a storage element for an intended delay time between a locally formed signal transition and a resultant detectable signal transition. The stations also comprise a continuous sequencer for the successive bit cells. When a signal transition is detected, the sequencers are loaded with the position of the storage element, so that they are synchronized. In the case of a transmission operation, the delay is measured, so as to update the contents of the storage element.

7 Claims, 3 Drawing Sheets

SINGLE-CHANNEL BUS SYSTEM FOR MULTI-MASTER USE WITH BIT CELL SYNCHRONIZATION, AND MASTER STATION COMPRISING A BIT CELL SYNCHRONIZATION ELEMENT SUITABLE FOR THIS PURPOSE

DESCRIPTION

1. Background of the Invention

The invention relates to a single-channel bus system for multi-master use for mutually asynchronously controlled master stations using messages comprising an arbitration field of a uniform number of bit cells of fixed nominal length, followed by a data field, the bus having a dominant state and a non-dominant state.

Single-channel bus systems are inexpensive and can be readily implemented. The channel may be realized as a single conductor or as an anti-symmetrically controlled pair of conductors which may also be twisted. Applications may be the connection of control elements in a car, the interconnection of consumer electronic products, the connection of microcontrollers, memories, sensors and input/output elements in measuring and control equipment, and many others. A bus system of this kind is described in the article by U. Kiencke et al., Automotive Serial Controller Area Network, S.A.E. Technical Paper Series, No. 860391, Int. Congress and Exposition, Detroit, Mich., U.S.A., 24–28 Feb., 1986, pages 1–6.

2. Summary of the Invention

For the arbitration the known system utilizes a dominant state of the bus signal versus a non-dominant state of the bus signal in that, for example a wired AND-function is implemented: in that case the logic -0- is dominant. For a wired OR-function, the logic -1- is dominant. It is a problem that a given delay occurs between the formation of a signal transition by a master station and the detection of a possibly resultant change of the bus state in the same station. Per master station there may be present:

a storage element for storing an intended delay time between a locally generated signal transition and a resultant detectable signal transition;

a sequencer having a cycle duration which corresponds to said nominal length for starting an arbitration field bit cell in a given position;

a first adjusting element (148) for presetting said sequencer with the contents of the storage element under the control of a transition to the dominant bus state. Thus, a master station which is late in starting a bit period can as it were catch up with a master station starting earlier, so that they transmit their arbitration bits simultaneously.

In the foregoing, asynchronous is to be understood to mean that the clock frequencies of the respective stations are substantially equal, so that once mutual synchronization has been realized it can be readily maintained. On the other hand, they may deviate to such an extent that stations for which this synchronization is not expressly maintained may eventually run out of synchronization in a random manner. The delay between the formation of a signal transition and the ultimate detection of the effect thereof is influenced to a high degree by the bus configuration as represented by the number of stations. Each station represents a given capacitance. If the delay to be ultimately realized is uncertain in that the bus configuration is not known in advance or is even variable (the number of stations may vary), either the stations must satisfy stricter tolerance requirements or the flexibility of the bus configuration must be reduced, or the delay time stored must be adjusted in advance to the correct, individualized value. The foregoing increases the costs or reduces the feasibility of application.

It is an object of the invention to supplant the delay time as realized in practice in the above system for the intended delay time, thus achieving automatic adaptation and flexibility. The object in accordance with the invention is achieved in that at least one master station comprises a second adjusting element (140) for loading the prevailing position of said sequencer into said storage element during the data field of a message to be transmitted by the relevant master station, under the control of a further transition to the dominant bus state. The means required are simple and no external control or monitoring is necessary.

The invention also relates to a master station for use in such a bus system, in which said sequencer is formed by a binary counter, a data input having a width of at least two bits and a data output having a width of at least two bits thereof being connected in parallel to a data output and a data input, respectively, of said storage element. This results in an inexpensive solution which can be readily implemented. Further attractive aspects are cited in the dependent claims. The invention can be attractively used notably in a car. The respective stations can then be:

board computer
control means for the ignition and the drive process
control elements for the brakes
control elements for the lights
control elements for climate control inside the car
sensor elements and associated data presentation
signal elements, such as lamps, horn, and associated signal converter.

BRIEF DESCRIPTION OF THE FIGURES

The invention will be described in detail hereinafter with reference to some Figures. Therein.

DESCRIPTION OF THE BUS SYSTEM USED

Figure 1:
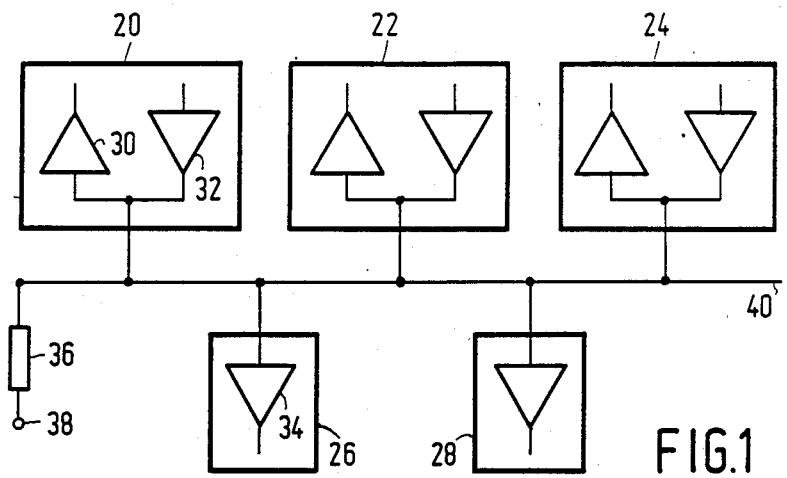
FIG. 1 shows a diagram of a bus system.

FIG. 1 shows a diagram of a bus system according to the known state of the art. Three stations 20, 22, 24 which are capable of transmission as well as reception are connected to a single-channel bus 40. For this purpose the station 20 comprises a transmitter element 32 and a receiver element 30. The transmitter element 32 is capable of transmitting bits which fill each time the interval of a bit cell. The bit cell then has a length determined by the local clock element; this length amounts to a number of clock pulses, for example, 4, 8, 16 pulses etc. A number smaller than 4 hardly occurs in practice. The bus 40 has a dominant signal state and a non-dominant signal state. This is symbolized by a resistor 36 and a terminal 38 which can be connected to a reference potential. It is assumed that the output impedance of the transmitter element 32 is low at least in the signal state which deviates from the reference potential with respect to the resistor 36. In that case that signal state is dominant if the output impedance associated with the other signal state is high. The resistor 36 can also be formed by the internal electronic circuitry of a station.

Also present are two stations 26, 28 which can operate only in the receiving mode. To this end, the station 26 comprises a receiver element 34. In some realizations only bidirectionally operating stations will be present.

Figure 2:
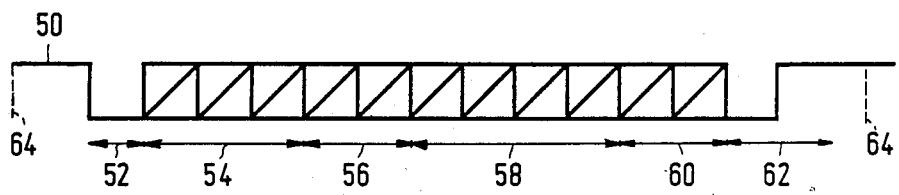
FIG. 2 shows a message format.

FIG. 2 shows a message format as published in the cited reference. The intended bus signal state is given by line 50. The frame starts with the start bit 52. In many cases this bit has a length which deviates from that of the further bits; in the present embodiment, all bits nominally have the same length. The start bit is followed by the arbitration field 54. This field comprises a number of bits which is uniform for all statons, but the number itself is arbitrary. Arbitration can be performed on the basis of source identity numbers: each master station has its own number which deviates from that of all other master stations. The transmission of the source identity numbers commences after the start bit. In the case of non-corresponding bits, the bit corresponding to the dominant bus state will "win"; i.e., each station which detects a discrepancy between its own identity number and a realized bus state will immediately interrupt the transmission of (any) further bits of its identity number, thus considering the arbitration as having been "lost". Thus, a preferred arbitration number will win in all circumstances. Thus, subsequent to the arbitration field, there will only be one master station. Arbitration can in principle be performed on a destination identity number. In that case steps must be taken to ensure that each master station can indeed transmit as the only station in a part of the message. Such a step may be:

each master station has its own slave stations: the arbitration result is then always unambiguous;

at a higher level a step is taken so that undecided arbitration is precluded, at least in given circumstances (for example, after a general reset signal).

In this case the arbitration field again has a fixed length. It is also to be noted that the station may have a physical address as determined by its location along the bus. Alternatively, there may be a functional address so that the operation is independent of the physical location of the relevant station.

The message format also comprises:

a control field 56. This may indicate, for example the length of the message, measured in bytes or otherwise;

a data field 58; the contents of the data may be an address of an intended destination station (or a so-called overall address (broadcast)), or information to be used in the destination station. The latter information may concern control information as well as "real" data.

an error protection field 60; for example using a CRC-code, Hamming-code, or otherwise;

an acknowledge field 62. This field comprises a section in which the master station definitely transmits a signal which corresponds to the non-dominant bus state; during this section a receiver station can transmit an acknowledge bit. In the present example, the acknowledge field has a length of two standard bit cells. The acknowledge field is followed by an interval until the dotted line 64 which indicates the end of message (EOM). The length of this interval is determined by an expected tolerance between the transmission and the reception of the acknowledge field by the stations. Subsequently, a next message may commence (with the same or another master station).

The bits in FIG. 2 which may have an arbitrary value are provided with a diagonal stroke. The other bits (start, acknowledge bits and signal state beyond a message) always have the values given for all stations. The rise times of signal transitions are finite in practice. The receiver elements 30, 34 and others comprise a discrimination element which makes a distinction between the -0- state and the -1- state. The result may be -1-: above a given level, -0-: below a given other level. The result is indeterminate in the intermediate region: the reaction of one station may differ from that of the other. In conjunction with the finite rise time of the signal edges, this implies that a signal transition formed by a master station (for example, via the transmitter element 32) can be detected by the station only after a delay time (i.e. via the receiver element 30). This delay time is determined inter alia by the number of stations connected to the bus 40, because each station represents a given capacitance. It is assumed that the new signal of the transmitting station is not masked in the new state, because this new signal would be non-dominant.

Similarly, a signal transition formed by the station 20 is detected in another, receiving station only after a given delay. This delay, as determined by the bus capacity, is the same as in the transmitting station itself. As regards the transit time in the bus, the delay time may be different. The same can occur also due to a spread in the discrimination levels of the various stations. In many cases these spreading effects will be limited, the major part of the delay being determined by the bus capacity. The described delay also has an advantage: the susceptibility to interference is thus reduced.

EXEMPLARY EMBODIMENT OF A STATION

Figure 3:
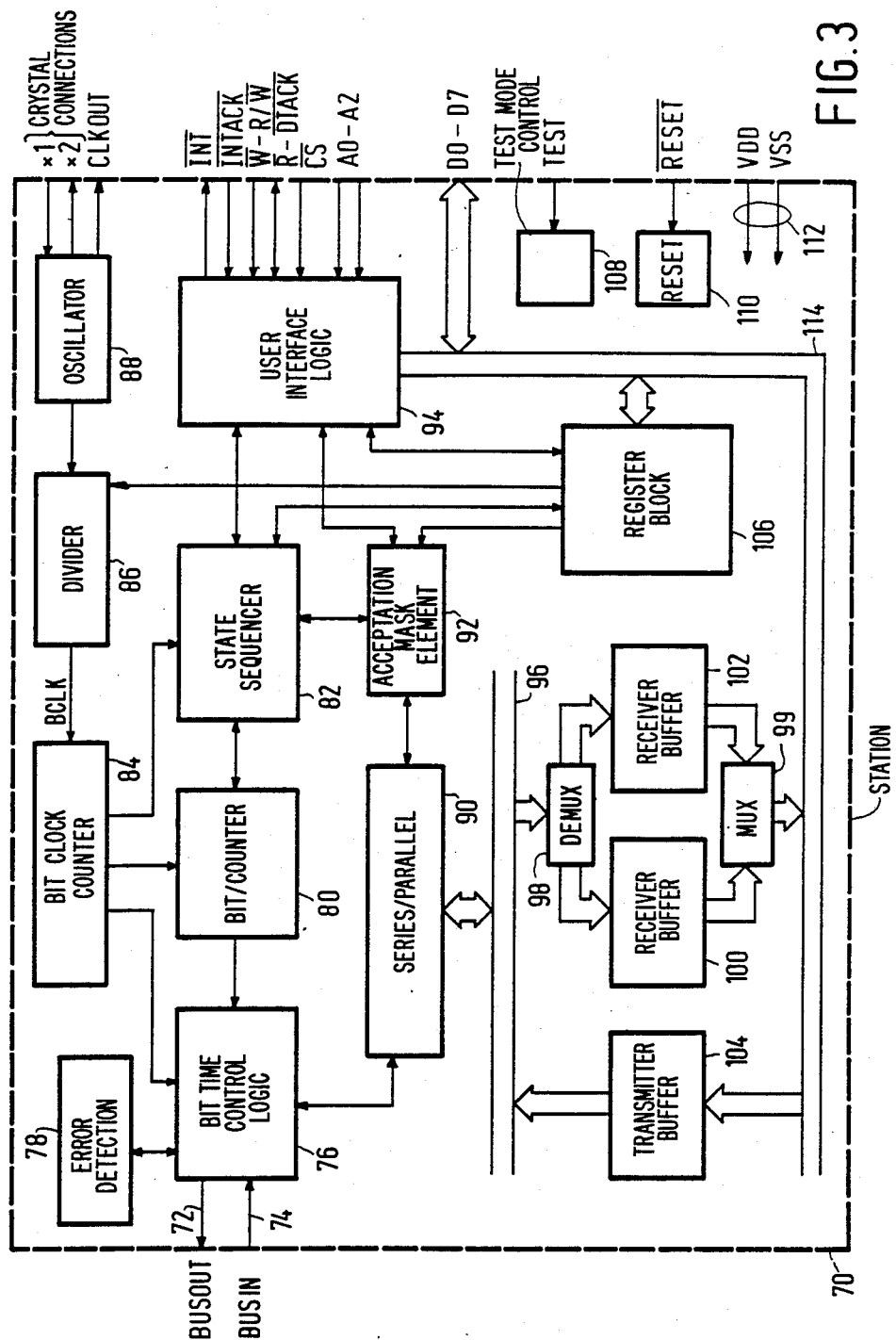
FIG. 3 shows a block diagram of a station in as far as the adaptation to the bus is concerned.

FIG. 3 shows a block diagram of a station in as far as the control of the bus is concerned. The circuit also provides adaptation for many types of microcontrollers, for example the 8051, 8096 and 68000 microcontrollers of various makes.

Line 72 is connected to a transmitter element 32, line 74 being connected to the receiver element 30. The connections on the other side are intended for the host microcontroller. Oscillator 88 comprises crystal connections X1, X2 and an output CLKOUT for the host. Element 86 is a divider which forms the bit clock signals (BCLK), i.e. a fixed number >1 per bit cell. The dividing factor is determined by the contents of a register in a register block 106 (not separately shown). Bit clock counter 84 counts the number of bit clock signals per bit cell and applies time signals to state sequencer 82, bit counter 80 and the bit time control logic 76. The bit time control logic processes the BUSIN/BUSOUT signals and will be described in detail hereinafter. Moreover, it can form the stuffing bits which serve only to render the data stream self-synchronizing, for example in that a bit of the opposite value is inserted each time after five bits having the same information value. Error detection element 78 comprises logic for the detection of errors in the CRC information, in the stuffing bits and other errors, if necessary. Series/parallel converter 90 acts as a shift register and forms an intermediate element between the serial bus 40 and the internal, parallel bus 96. Acceptance mask element 92 detects a message received and, in response thereto, applies an interrupt signal $\overline{INT}$ to the host via the element 94. Different masks are feasible on the basis of information stored in the register block 106. User interface logic 94 communicates various signals with the host, for example an interrupt signal, an interrupt acknowledge signal $\overline{\text{INTACK}}$, a read/write control signal (for registers) $\overline{\text{W-R}}/\overline{\text{W}}$, non-read/data acknowledge signal $\overline{\text{R-DTACK}}$ (line having a dual function), chip selection signal $\overline{\text{CS}}$, and three most-significant address bits A0 ... A2.

The transmitter buffer 104 offers room for a complete message to be transmitted. This message is supplied by the host via the data bus 114. A control command for the actual transmission is subsequently issued (via the elements 90, 76, 32). The transmitter buffer is addressed by way of an address pointer which is correctly adapted each time when a byte is written/read therein. Resetting is possible under the control of the control signal: -send a message- or if a status bit -buffer empty- is set.

Messages received are temporarily stored in the receiver buffers 100, 102. They operate alternately in the read mode and the write mode. Addressing is performed by means of adjustable pointers. When a receiver buffer is full or the command -enable the receiver buffer- is given, the relevant pointer is reset. The elements 98, 99 are a demultiplexer/multiplexer pair.

Element 108 controls a test mode according to the customary scan test or LSSD system. Element 110 controls the resetting of various elements. For the sake of brevity, a detailed description of such elements of FIG. 3 which are only of minor importance for the invention will be omitted, in as far as the synchronization at the bit level is concerned which is realized notably in the element 76. Further connections to/from block 70 are data D0–D7, test TEST, reset $\overline{\text{RESET}}$ and powering voltages VDD, VSS.

DESCRIPTION OF THE SYNCHRONIZATION

Figure 4:
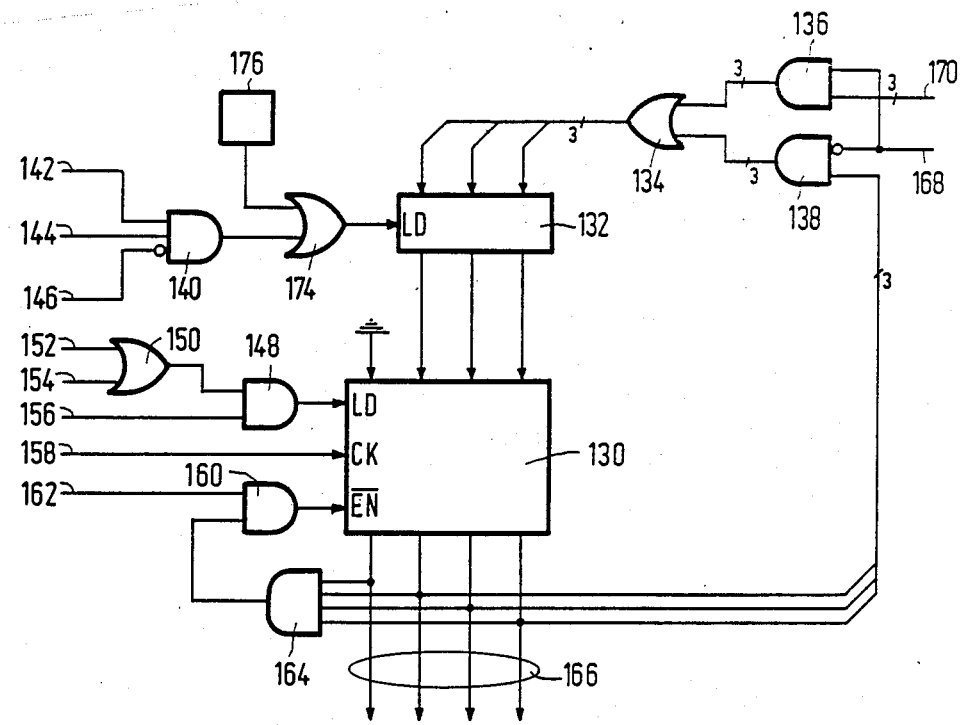
FIGS. 4 and 4a show the realization of the bit synchronization logic.

FIG. 4 shows a realization of the bit synchronization in block 76 of FIG. 3. The circuit comprises a register 132 having a width of three bits. The information thereof is applied to the three least significant bit positions of a four-bit counter 130. The three least significant bit positions thereof can be applied to the register 132 again via an AND-gate 138 and an OR-gate 134. The full count of the counter 130 appears on the bundle of lines 166. The remainder of the circuit comprises AND-gates 136, 148, 160, 164, AND-gates comprising an inverted input 138, 140, and OR-gates 134, 150, 174.

The circuit operates as follows. In an initialization state, the register 132 is loaded under the control of the program. The signal on the line 168 is then high, so that the gate 136 can conduct a 3-bit signal on the line 170 which is applied to the register 132 via the gate 134. The load control signal on the terminal LD is then also formed by the program as symbolically denoted by the block 176. The load control signal reaches the register 132 via the OR-gate 174. Steps are also taken to ensure that the contents of the register 132 can be loaded into the counter 130 and vice versa. The counter 130 is loaded under the control of a negative-going signal/-state edge on the bus (indicated by means of the line 156), provided that the OR-gate 150 outputs a logic -1-. This happens in one of the following two situations:

either the arbitration phase is being executed. Loading then takes place under the control of the start bit (the first negative-going signal transition at the beginning of the field 52), and also under the control of any subsequent arbitration bit cell containing a signal transition from the non-dominant bus state to the dominant bus state;

or the relevant station operates in the receiver mode so that it acts as a slave station (again on the negative-going edges of the bus state signal). The second method of loading may be omitted, if desired.

Furthermore, the counter 130 counts the bit clock signals supplied by the element 80 in FIG. 3. A given position of the counter, for example the full count 1111=15, forms a control signal for the transmission of a next bit, possibly via an appropriate decoder. Such transmission takes place, of course, only in the transmission mode. The AND-gate 164 combines all output signals of the counter 130. The output signal of this gate is combined, via the AND-gate 160, with the bus state signal -idle- (but not in use). The output signal of the gate 160 is applied to the enable input $\overline{\text{EN}}$ (the inverted value is active). The counter is then stopped. In all other situations the counter 130 continues counting. The -idle- signal is formed if no new start bit appears on the bus after the end of a message (line 64 in FIG. 2) and the station itself does not initiate a new message either.

As has already been explained, the register 132 is loaded in the first place in an initial phase. Furthermore, it is loaded each time when the AND-gate 140 supplies a logic 1. This is realized under the combined control of:

a negative-going signal edge of the bus state signal on the line 142 (same as 156);

a transmitter signal on the line 144, formed by the station itself;

a signal which indicates (line 146) that no arbitration is being carried out; in combination with the foregoing signal, this means that the relevant station has won the arbitration.

The contents of the register 132 then indicate the delay (measured in bit clock units) between the transmission of a signal transition on the bus and the instant at which the relevant station expects this transition to become manifest for that station. This expectation need not come true if another station sooner realizes the signal transition to be received or if the signal transition is masked.

Figure 5:
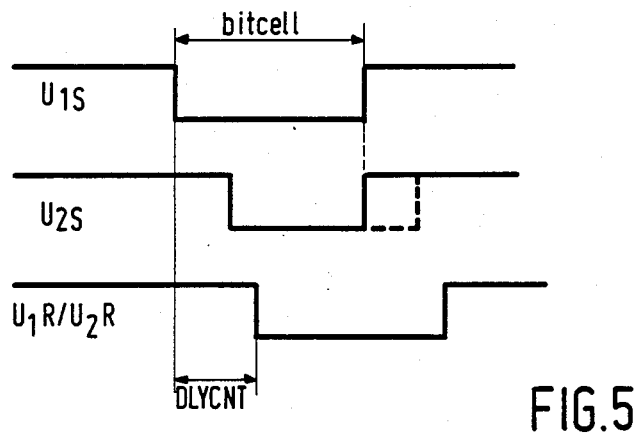
FIG. 5 shows some waveforms.

In this respect, FIG. 5 shows some waveforms. The first curve represents the output signal of a station which transmits a start bit (of the dominant value). For as long as a second station has not yet detected the change of the bus state, this second station can commence with its own start bit. The output signal of the second station is indicated by the second curve, the length of the bit cell being assumed to be the same, it would terminate only at the dotted line.

The third curve represents the signal as received by the stations, i.e. the first station as well as the second station. When the negative-going edge is detected, the first station loads its transmitter counter 130. As a result of the presetting realized during a previous adjustment operation, this will be exactly the count prevailing at that instant, so that loading is a notional operation. The second station then also loads its transmitter counter 130. As a result, as from that instant on the transmitter counters are synchronized and the bit cell is terminated also for the second station as denoted by a non-interrupted line. For further, subsequent bit cells all load operations are notional for both stations. As a result of this synchronization, the interrogation instants for the bus are also synchronized in both stations (see hereinafter), so that the effect of tolerances and disturbances is small. The delay is smaller than one half bit cell in practically all cases, so that the capacity of the register 132 need indeed be only three bits. Because, moreover, the contents of the register 132 is readjusted to a correct value corresponding to the actual delay measured, said effect is even further reduced. Tolerances in the operation of the respective stations can then be more readily permitted, so that the costs are reduced. Modification of the bus configuration can also be readily accepted.

Figure 4A:
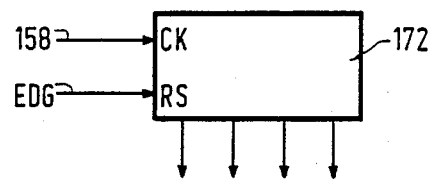

For the sake of completeness, FIG. 4a shows the receiver counter 172. This counter receives the bit clock signals on the input 158 and counts continuously. In reaction to any change of the bus state (positive-going and negative-going edges), a reset pulse is received on the reset input RS. A given counter position, for example 1000=8, controls the interrogation of the bus. The resetting also synchronizes the transmission and interrogation operations.

The realization shown in FIG. 3 may also be different. For example, instead of the binary counter 130 use can also be made of a shift register which operates as a 1-out-of-n counter. Furthermore, under some conditions the two counters may be combined.

References for FIG. 3:
76 bit timing logic
78 error detection
80 bit counter
82 start sequencer
84 bit clock counter
86 bit rate generator
88 oscillator
90 serial-parallel converter
92 acceptance mask
94 user interface logic
96 internal bus
98 demultiplexer
100 receiver buffer 1
102 receiver buffer 2
104 transmitter buffer
106 register block
108 test control element
110 reset control element
112 power supply leads.

What is claimed is:

1. A single-channel bus system for multi-master use for a plurality of mutually asynchronously controlled master stations using messages comprising an arbitration field of a uniform number of bit cells of fixed nominal length, followed by a data field, the system comprising:
   (a) a bus having a dominant state and a non-dominant state, and
   (b) for each respective master station:
      a storage element for storing an intended delay time between a local signal transition generated by the respective master station and a resultant detectable signal transition, which resultant detectable signal transition results from the local signal transition and is detectable on the bus;
      sequencer means, having a cycle duration which corresponds to said nominal length, for starting an arbitration field bit cell when the sequencer means reaches a given state within a cycle;
      a first adjusting element (148) for presetting said sequencer means with the contents of the storage element under control of a state transition, on the bus, to the dominant bus state;
   wherein
   (c) at least one master station comprises
      a second adjusting element (140) for loading a current state of said sequencer means into said storage element during the data field of a message to be transmitted by the respective master station, under control of a further state transition, on the bus, to the dominant bus state.

2. The system of claim 1, wherein:
   (a) the storage element is a register having a plurality of parallel outputs and a plurality of parallel inputs; and
   (b) the sequencer means is a counter having
      (i) a plurality of parallel inputs coupled with the parallel outputs of the register;
      (ii) a maximum count which corresponds to the cycle duration;
      (iii) a current counting position of the counter which is the current state of the sequencer means; and
      (iv) a plurality of parallel outputs coupled with the parallel inputs of the register.

3. A master station for use in a bus-system along with at least one other master station, the master stations in the bus-system being mutually asynchronously controlled using messages comprising an arbitration field of a uniform number of bit cells of fixed nominal length, followed by a data field, the bus-system further including a bus having a dominant state and a non-dominant state, the claimed master station comprising:
   (a) a storage element for storing an intended delay time, which intended delay time represents a delay between a local signal transition generated by the respective master station and a resultant detectable signal transition, which resultant detectable signal transition results from the local signal transition and is detectable on the bus;
   (b) sequencer means, having a cycle duration which corresponds to said nominal length, for starting an arbitration field bit cell when the sequencer means reaches a given state within a cycle;
   (c) a first adjusting element (148) for presetting said sequencer means with the contents of the storage element under control of a station transition, on the bus, to the dominant bus state; and
   (d) a second adjusting element (140) for loading a current state of said sequencer means into said storage element during the data field of a message to be transmitted by the master station, under control of a further state transition, on the bus, to the dominant bus state.

4. The master station of claim 3 wherein
   (a) the storage element has a plurality of parallel outputs and a plurality of parallel inputs; and
   (b) the sequencer means is a counter having
      (i) a plurality of parallel inputs coupled with the parallel outputs of the storage element;
      (ii) a maximum count which corresponds to the cycle duration;
      (iii) a current counting position of the counter which is the current state of the sequencer means; and
      (iv) a plurality of parallel outputs coupled with the parallel inputs of the storage element.

5. The master station of claim 3 wherein the storage element is a register.

6. The master station of claim 3 wherein
   (a) the master station is adaptable to assume a slave state; and
   (b) the sequencer means is presettable with the contents of the storage element, under the control of a state transition, on the bus, to the dominant bus state.

7. Apparatus for synchronizing a master station with at least one other master station in a single-channel multi-master bus-system, the bus-system including a bus having a first and second state, the apparatus comprising:
  (a) means for transmitting and receiving bits to and from the bus, the bits having a fixed nominal length;
  (b) means for storing an anticipated delay time between a local signal transition generated by the master station and a resultant detectable signal transition, which resultant detectable signal transition results from the local signal transition and is detectable on the bus;
  (c) means for creating a cycle, having a duration which corresponds to said fixed nominal length, and for starting transmission by the master station of a bit of a first type at a given state within the cycle;
  (d) means for presetting said cycle creating means with contents of the storing means, under control of a state transition between the first and second states on the bus; and
  (e) means for loading a current state, of the cycle creating means, into the storing means during transmission by the master station of a bit of a second type under control of a further state transition between the first and second states on the bus.

* * * * *